United States Patent [19]
Di Nunzio et al.

[11] Patent Number: 5,619,904
[45] Date of Patent: Apr. 15, 1997

[54] AUTOMATIC TEA BREWING DEVICE AND TEA POT RECEPTACLE

[75] Inventors: David Di Nunzio, Mentor, Ohio; Joseph F. Moore, Richmond, Va.; Phillip L. Brookshire, Cincinnati, Ohio; Robert A. DeMars, Woodland Hills; Spencer L. Mackay, Agoura Hills, both of Calif.; Craig Weidman, Aurora, Ohio

[73] Assignee: Healthometer, Inc., Bedford Heights, Ohio

[21] Appl. No.: 525,461

[22] Filed: Sep. 8, 1995

[51] Int. Cl.⁶ .................................................. A47J 31/00
[52] U.S. Cl. ............................................. 99/295; 99/299
[58] Field of Search ............................ 99/306, 295, 280, 99/279, 281, 282, 299, 300; 426/433

[56] References Cited

U.S. PATENT DOCUMENTS

| | | |
|---|---|---|
| 1,965,750 | 7/1934 | Richheimer ............................ 99/306 |
| 4,790,240 | 12/1988 | Henn et al. . |
| 4,843,954 | 7/1989 | Henn . |
| 4,843,955 | 7/1989 | Henn et al. . |
| 4,922,809 | 5/1990 | Führer . |
| 4,924,922 | 5/1990 | Johnson . |
| 4,977,819 | 12/1990 | Lorenz . |
| 4,998,463 | 3/1991 | Precht et al. . |
| 5,046,409 | 9/1991 | Henn . |
| 5,063,837 | 11/1991 | Precht . |
| 5,081,915 | 1/1992 | Beumer . |
| 5,251,541 | 10/1993 | Anson ...................................... 99/299 |
| 5,367,946 | 11/1994 | Yasunaga . |

*Primary Examiner*—Robert W. Jenkins
*Attorney, Agent, or Firm*—Calfee Halter & Griswold

[57] ABSTRACT

A device for automatically brewing and holding tea has a water reservoir and a combined water reservoir inlet and heated water distributor attached to and extending from the water reservoir, a hinge mounted steeping chamber positionable over a base for holding a tea pot under the steeping chamber, and a tea pot specially adapted for use with the device having a flat bottom surface for optimal heat transfer from the base to the receptacle. A steeping chamber flow control valve includes opposing, overlapping relatively adjustable frusto-conical surfaces.

30 Claims, 11 Drawing Sheets

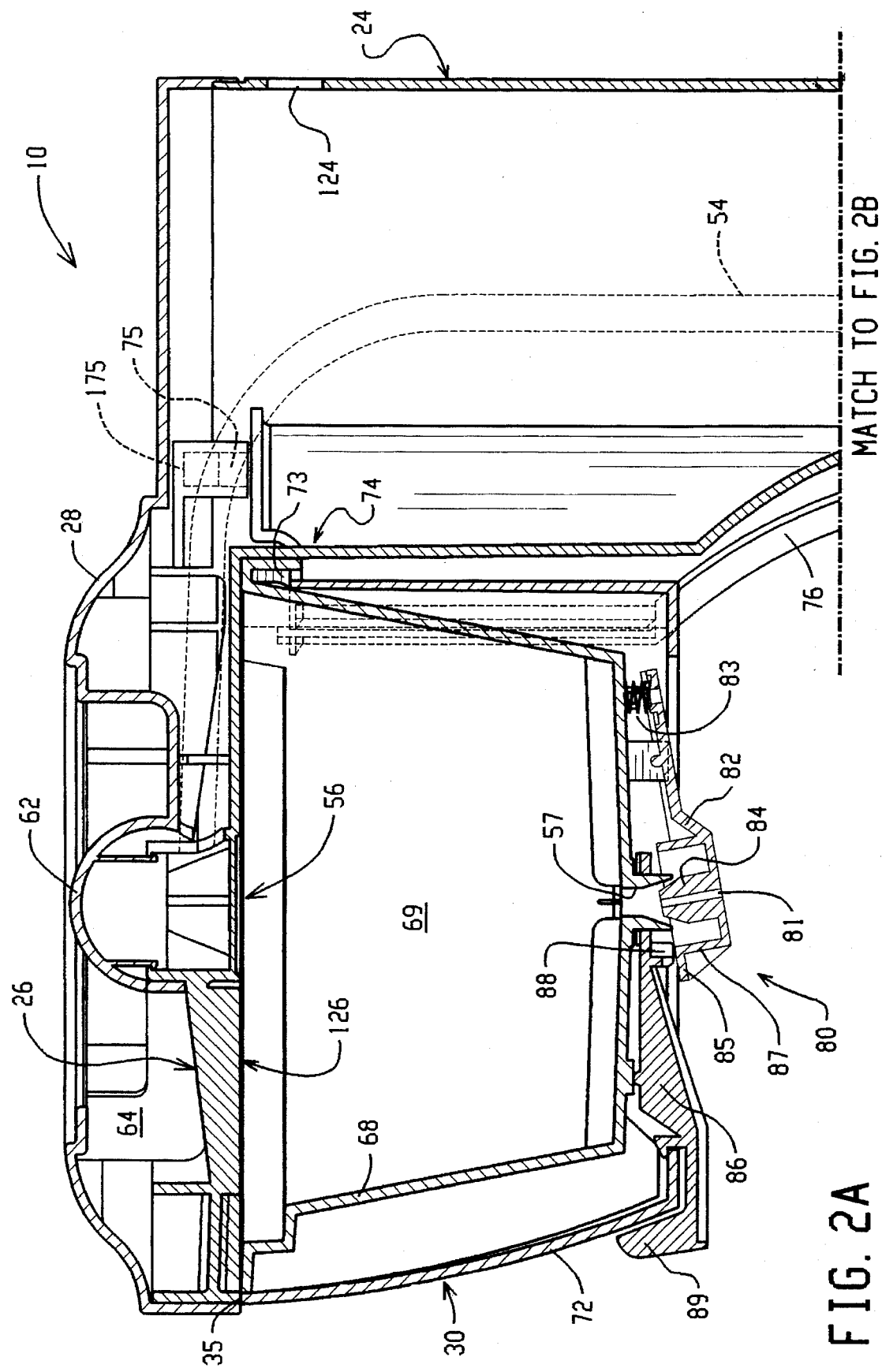

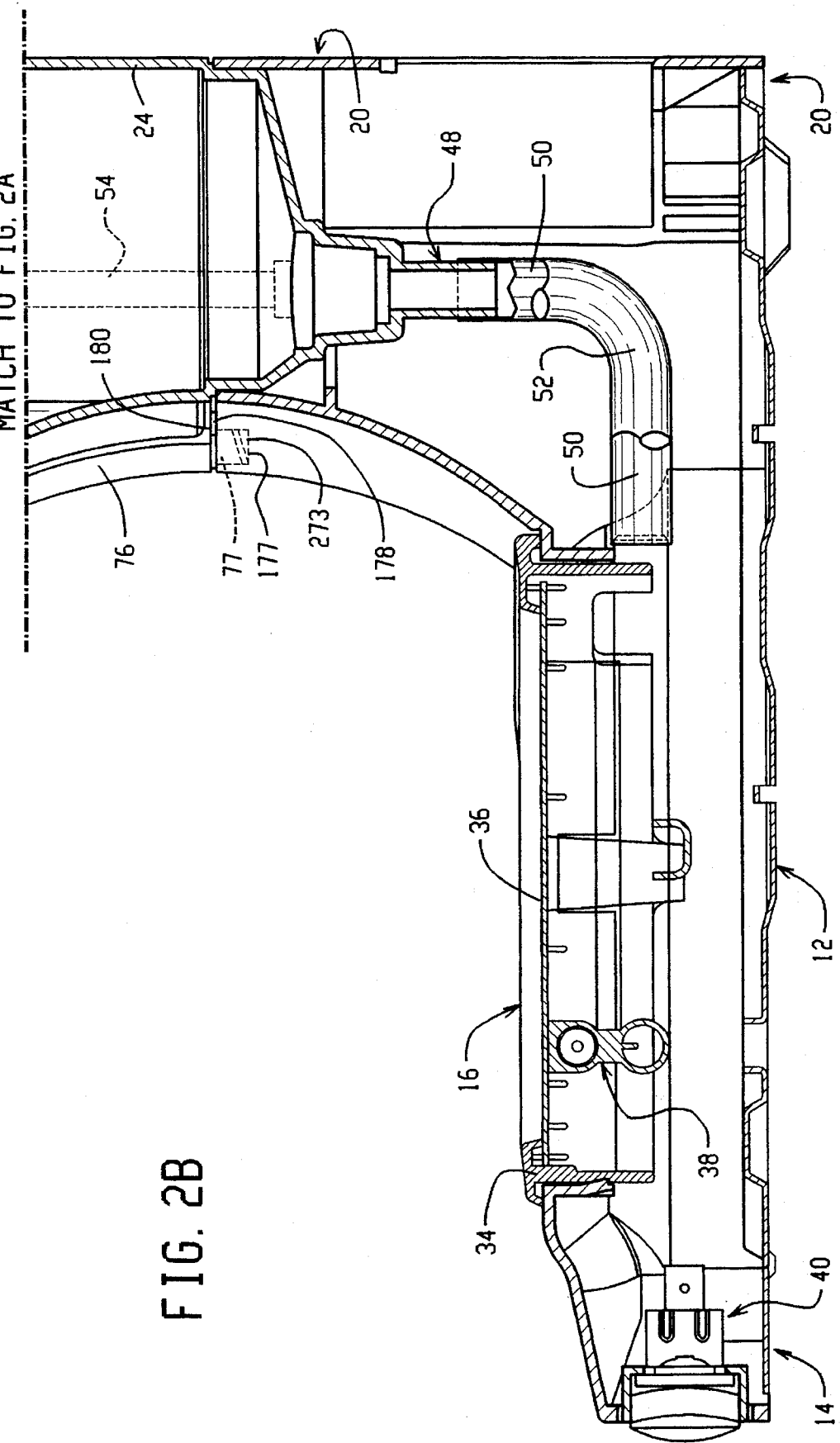

ས5,619,904

AUTOMATIC TEA BREWING DEVICE AND TEA POT RECEPTACLE

FIELD OF THE INVENTION

The present invention pertains in general to automatic brewing devices and, in particular, to automatic brewing devices for brewing tea.

BACKGROUND OF THE INVENTION

Brewed tea is traditionally prepared by first boiling water and then transferring the boiling water to a pot holding tea leaves in a tea ball or bag. The tea is allowed to steep whereupon flavor is extracted from the tea leaves into the water. The strength of the flavor of the tea is primarily dependent upon the length of the steeping period.

Automatic brewing devices which heat water and transfer the heated water to a brewing basket or chamber for contact with a brewing material have heretofore been principally employed for brewing coffee and coffee related drinks such as cappucino. Such devices can be used with some success for preparing hot tea. See for example U.S. Pat. Nos. 4,790,240 and 4,843,954. However, since coffee-derived beverages typically do not require a steeping process wherein heated water is held in prolonged contact with ground coffee beans, these devices simply drain the brewing water from a brewing, devices which do not provide precise control of the rate of flow of heated water through a steeping chamber in which tea leaves are held are not ideally suited for brewing tea.

Automatic coffee makers typically utilize relatively thin-walled glass receptacles or decanters to receive, hold and thermally insulate the brewed coffee. Though suitable for coffee, these types of decanters are inadequate as receptacles for hot brewed tea for the reasons that they do not provide maximum insulation for heat retention including the absence of an insulative lid or cover, and are not aesthetically appropriate for typical tea drinkers accustom to serving hot tea from a traditional tea pot.

The present invention overcomes these and other disadvantages of the apparatus and methods of the prior art used to automatically prepare hot tea.

SUMMARY OF THE PRESENT INVENTION

The present invention provides entirely new and novel apparatus and method for the preparation, including steeping and retention, of hot tea which overcomes the inadequacies of all prior apparatus and methods.

In accordance with one aspect of the invention, an apparatus for brewing and holding hot tea includes a water reservoir, a water reservoir filling inlet positioned not directly over the water reservoir, a heated conduit connected to the water reservoir for heating water from the reservoir, heated water transfer means for transferring heated water from the reservoir into a steeping chamber, the steeping chamber including a cavity for receiving and holding heated water and tea and a controlled valve for releasing brewed tea from the steeping chamber at the end of a controlled steeping period into an insulative tea pot receptacle having a handle, and a spout with an opening separate from a top opening in the tea pot.

In accordance with another aspect of the invention, an apparatus for automatically brewing hot tea includes a water reservoir, a combined heating and pumping element in contact with the water reservoir for heating water from the water reservoir and pumping the heated water into a brewing chamber, the brewing chamber having a cavity for receiving tea and heated water and an opening through which brewed tea is released from the brewing chamber into an insulated tea pot having a bulbous body, a handle integrally molded or mechanically attached to the body, and a spout extending from a side of the bulbous body generally opposite the handle and having a spout opening separate from a top opening in the bulbous body.

In accordance with still another aspect of the invention, a device for automatically brewing tea and maintaining brewed tea in a heated condition includes, in combination, a housing including a tea pot base, a water reservoir, a heating element positioned in the tea pot base and connected to the water reservoir, a combined heated water distributor and water fill inlet extending forward from the water reservoir and positioned over the tea pot base, and a molded tea pot having a flat bottom dimensioned to fit upon the tea pot base, a handle, and a spout having an opening separate from or inclusive of an opening to a main body section of the tea pot.

In accordance with still another aspect of the invention, a receptacle specially adapted for use with an automatic tea brewing device is provided which has a bulbous main body having a cavity for receiving brewed tea through a top opening to the main body, a handle attached to the main body, a spout which extends from the main body and has a spout opening separate from the top opening to the main body, a lid for the top opening to the main body, and a flat bottom which extends in a horizontal plane radially inward from bottom edges of the bulbous main body.

These and other aspects of the invention are herein described in particularized detail with reference to the accompanying Figures.

BRIEF DESCRIPTION OF THE FIGURES

In the accompanying Figures:

FIGS. 2A and 2B matched together form a cross-sectional side elevation of the automatic tea brewing device of the present invention;

DETAILED DESCRIPTION OF PREFERRED EMBODIMENTS

Figure 1:
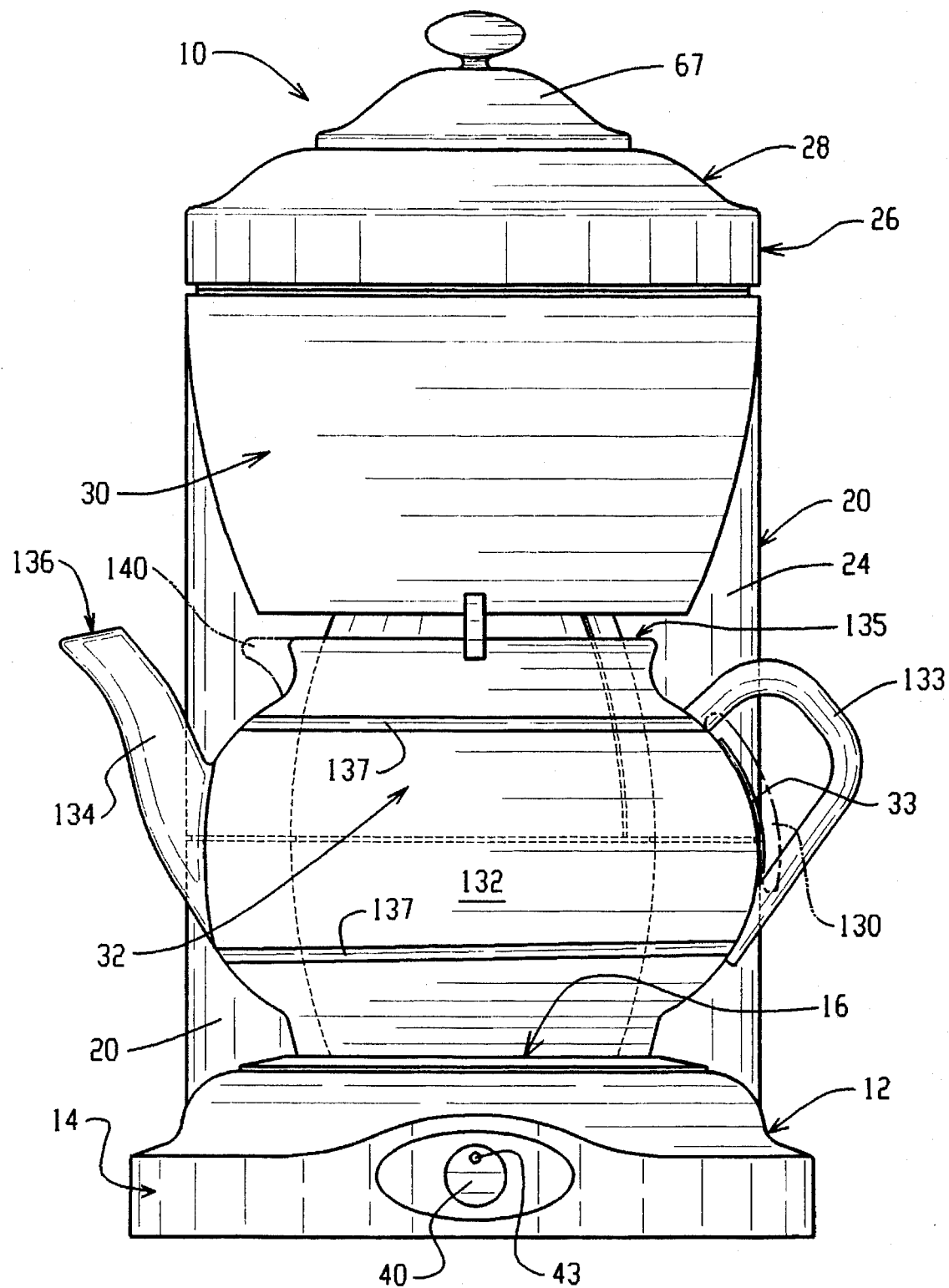
FIG. 1 is a front elevation of the automatic tea brewing device of the present invention.

With initial reference to FIGS. 1 and 2A and 2B, there is illustrated an automatic tea brewing device, indicated generally at 10, which is particularly adapted and especially suited for brewing or steeping and holding and warming tea. As used herein, the terms "brewing" and "steeping" are synonymous, both meaning controlled contact of a brewing material such as tea with hot or cold water. The device includes the basic components of a base section 12 which has a forward section 14 which includes a heated tea pot warming platform 16 and a housing for a heating element contained therein. A specially designed tea pot 32 is dimensioned to fit upon warming platform 16. The device further includes a rearward section 20 behind tea pot 32; a water reservoir 24 (also behind tea pot 32) which fits upon and is supported by the rearward section 20 of base section 12 a combined water reservoir inlet and heated water distributor structure 26 (also referred to herein sometimes simply as the "water reservoir inlet" or "water inlet" or "heated water distributor" or "structure") which extends forward of the water reservoir 24 and over the tea pot platform 16 and tea pot 32, a cover 28 which covers both the combined water reservoir inlet and the water reservoir 24, and a brewing or steeping chamber (also referred to as a "brew basket"), indicated generally at 30, supported by a hinged support arm 76 attached to the base and cover and retractable against a frontal wall of the water reservoir 24. An overflow drain hole 124 is provided near the top of the back wall of water reservoir 24. Each of the aforementioned components are described in further detail below.

As shown in FIG. 1, the specially adapted tea pot 32 is dimensioned to fit upon the tea pot platform 16 and within the area defined by the frontal wall of the water reservoir and the underside of the steeping chamber 30. The tea pot 32 has a handle 133 which may be integrally formed or otherwise mechanically attached to extend from the side of the generally bulbous body 132 which has a top opening 135, and a spout 134 which extends from a side of bulbous body 132 at a point generally opposite handle 133. Spout 134 has a pouring spout opening 136 separate and apart from top opening 135 of tea pot 32. In an alternate embodiment, a lip spout 140 (shwon in phantom) may be formed in the lip of top opening 135 instead of spout 134.

The tea pot 32 may be integrally formed or molded or cast of any suitable material and is preferably formed of ceramic or porcelain or other vitreous or stoneware material which has suitable structural and insulative properties and appearance and weight characteristics consistent with traditional ceramic or porcelain tea pots. This unique construction and appearance of tea pot 32, and in combination with the automatic brewing device of the invention, eliminates the need to transfer brewed tea from a carafe or other receptacle into a socially attractive and functional tea pot such as tea pot 32.

An insulating pad 33 is applied to the area of the exterior surface of the bulbous body 132 of the tea pot proximate to handle 133 to prevent transfer of heat from the tea pot vessel to a hand gripping the handle. The insulating pad 33 can be made of any material having relatively low thermal conductivity/insulative properties such as for example polyurethane, plastic, rubber, paper, cork, etc. The insulating pad 33 may be adhesively or mechanically secured to the exterior of bulbous body 132. For mechanical attachment, the insulating pad 33 may be snap-fit between the segments of handle 133 which intersect bulbous body 132, such as insulating pad 130 also shown in FIG. 1. As further shown in FIG. 1, handle 133 may be mechanically attached to the tea pot body 132 by, for example, straps 137 which encircle body 132 and are secured to the ends of the handle which abut body 132.

Figure 8:
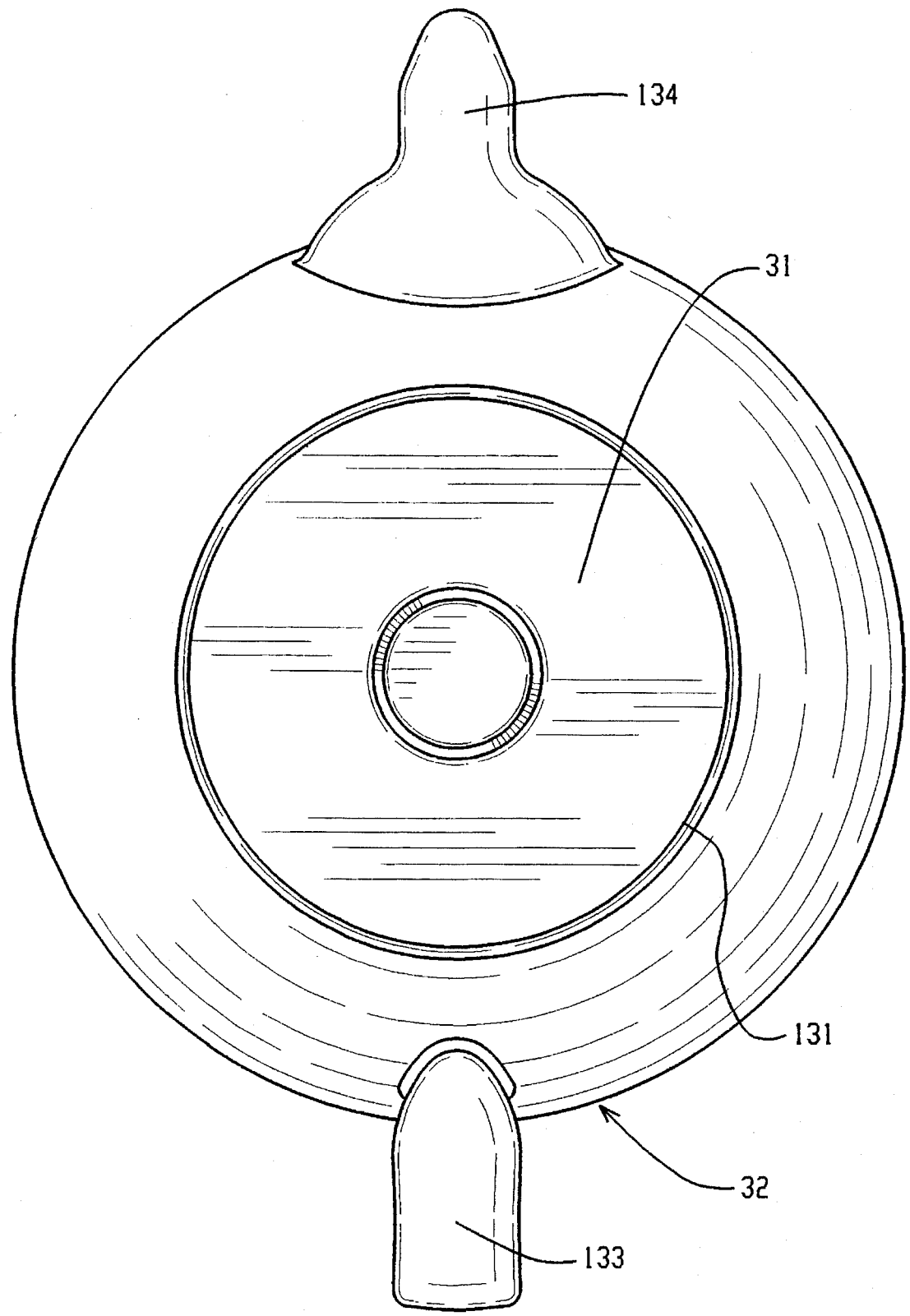
FIG. 8 is a bottom view of the tea pot of the automatic tea brewing device of the present invention.

As shown in FIG. 8, the bottom of the tea pot 32 is provided with a substantially flat surface area 31 which rests directly upon a substantially flat surface of heating platform 16 to optimize heat transfer from the warming platform 16. A selected percentage such as for example approximately 50% or more or less of the total surface area of the tea pot bottom is formed substantially flat (for example by grinding and/or polishing if required) to optimize heat transfer characteristics as the tea pot rests or sits flush upon the heated platform 16. In a preferred embodiment, the flat surface area 31 is completely flat from a bottom edge 131 of the bulbous body 132 and extends radially inward in a horizontal plane toward the center of the generally circular bottom. This novel configuration of the tea pot bottom is contrary to traditional tea pot bottom designs which have a bottom edge rim which elevates the bottom of the main body portion of the pot from a supporting surface so as to minimize contact with a supporting surface. Also in the preferred embodiment, the flat surface area 31 of tea pot 32 has a cross-section thickness approximately equal to a cross-section thickness of the walls of the bulbous body 132.

As further illustrated in FIGS. 2A and 2B, the tea pot warming platform 16 is incorporated into forward section 14 of base 12 by placement of a ring 34 within an opening in the base and encompasses a plate 36. Ring 34 may be made of a phenolic material and plate 36 of a metallic material such as aluminum. A water heating and warming element 38, operative to heat water drawn or drained from the water reservoir and pump the water by thermal expansion from a water conduit of the heating element to a heated water distributor as generally known in art and described for example in U.S. Pat. Nos. 4,613,745 and 5,183,998 incorporated herein by reference, is positioned underneath and in contact with plate 36 to perform the water heating function and provide a heat source to warming platform 16 and tea pot 32. The forward section 14 of base 12 also houses a switch, indicated generally at 40, electrically connected to the circuit elements also housed within base 12 proximate to heating and warming element 38.

Figure 3:
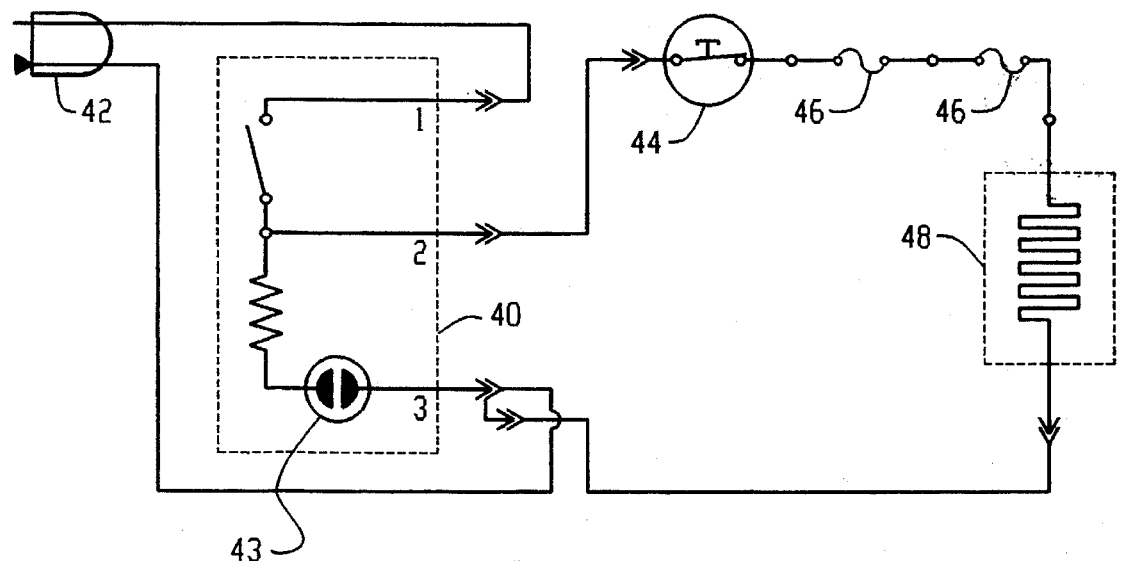
FIG. 3 is a schematic diagram of the electrical heating control circuit of the automatic tea brewing device of the present invention.

As schematically illustrated in FIG. 3, switch 40 is connected to a plug 42 and in series to a thermostat 44, thermal fuses 46 and heater resistive element 48 of heating and warming element 38. With the switch in the closed "on" position, indicator light 43 (which may be incorporated into the control button of switch 40) is illuminated and the heater element is energized to a maximum heating temperature regulated by thermostat 44 and limited by fuses 46.

Referring again to FIGS. 2A and 2B, a bottom portion of water reservoir 24 includes an integrally formed stepped funnel 48 adapted to receive a pressure-controlled unidirectional plunger type check valve (not shown) known in the art to allow water to drain from the reservoir to the heating element and prevent water from re-entering the reservoir. A water supply tube 50 connects funnel 48 to an input end of heating and warming element 38. A heated water supply tube 52 connects an output end of heating and warming element 38 to a riser tube 54 (shown in phantom) generally vertically disposed within water reservoir 24 and bent at an upper end to lie flat within the water reservoir inlet 26 and terminated at a heated water distributor hole 56 formed centrally in the underside of the combined water reservoir inlet and heated water distributor structure 26 and over the steeping chamber 30. A flow path from the water reservoir, through the heating element, and to the steeping chamber is thus provided.

Figure 4:
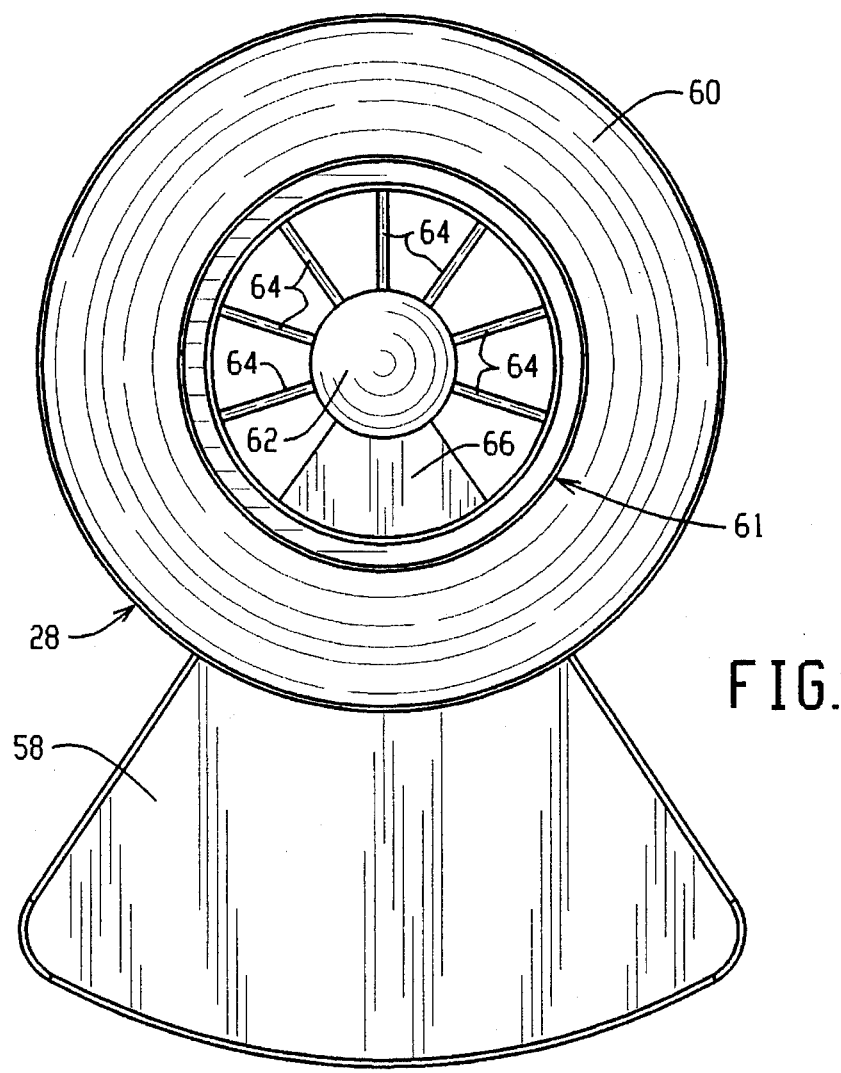
FIG. 4 is a top view of the cover of the automatic tea brewing device of the present invention.

With additional reference to FIG. 4A, the water inlet and reservoir cover 28 includes a solid rearward section 58 which covers the top opening of the water reservoir, and a forward water inlet section 60 which fits over the forward end of the combined water reservoir inlet and heated water distributor structure 26. The water inlet section 60 of cover 28 is uniquely constructed and contoured to cover the heated water distributor hole 56 and to provide a splash-free water disbursement structure. The generally circular opening or aperture 61 includes a dome 62 (positioned directly over the heated water distributor hole 56) and multiple fins 64 which extend radially from the dome to the periphery of the opening 61. Water poured into the forward positioned water inlet section 60 of cover 28 is evenly distributed without splashing onto the water reservoir inlet 26, which is internally sloped into water reservoir 24. The positioning of the combined water reservoir inlet and heated water distributor structure 26 forward of and not directly over the water reservoir allows the reservoir to be conveniently filled without having to reach to the back of the device, and without having to pour water directly into the top of the water reservoir. Circular opening 61 is dimensioned to be covered by lid 67 of tea pot 32 as shown in FIG. 1. The structural arrangement of dome 62 and radially extending fins 64 substantially reduces and in most cases eliminates any splashing of liquid poured into water inlet section 60.

Figure 5A:
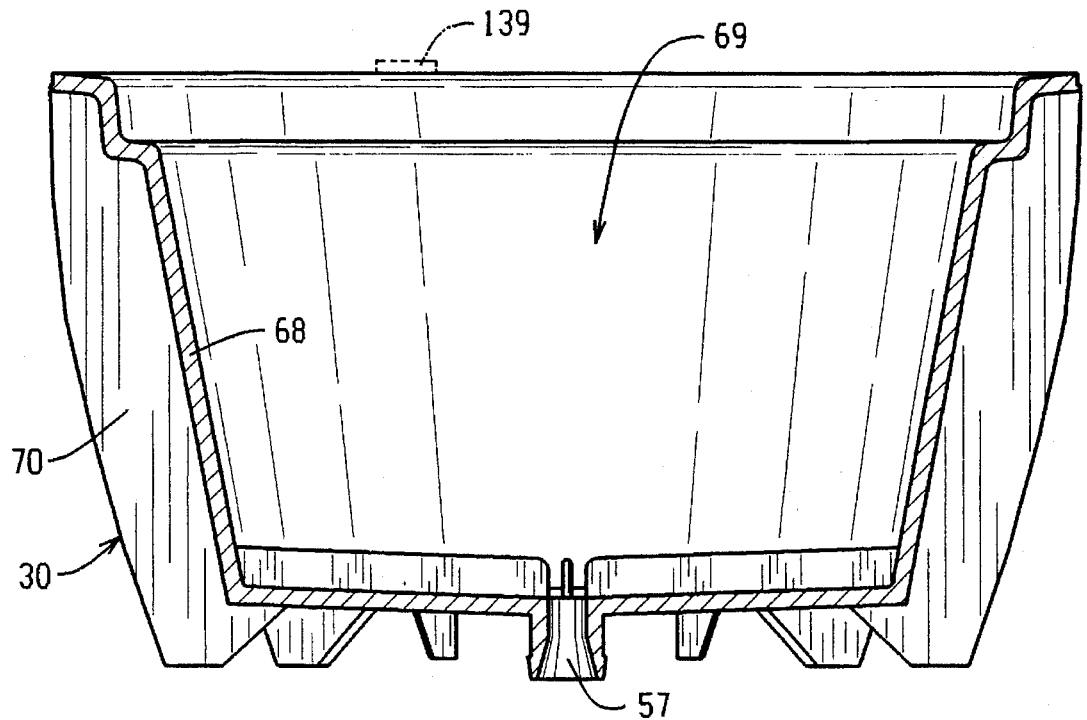
FIG. 5A is a cross-sectional side elevation of the inner component of the steeping chamber of the automatic tea brewing device of the present invention.
Figure 5B:
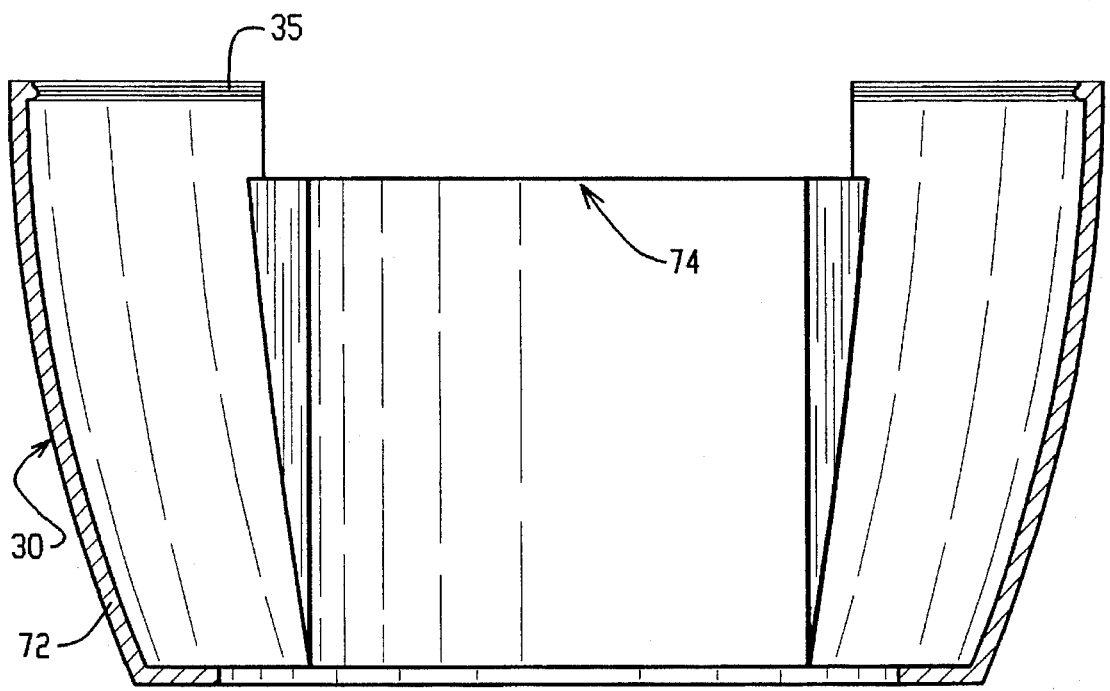
FIG. 5B is a partial cross-sectional side elevation of the outer component of the steeping chamber of the automatic tea brewing device of the present invention.

As shown in FIGS. 2A, 5A and 5B, the steeping chamber 30 is formed of an inner section 68 (FIG. 5A) which fits within an outer section 72 (FIG. 5B). Inner section 68 includes a cavity 69 for receiving tea in a bag, filter or tea ball and a quantity of heated water for steeping and a brewed tea exit port 57 in the center of the bottom wall. The cavity 69 of the inner section is dimensioned to optimize the water line or steeping head of the heated water introduced from the water distributor and with tea in the steeping chamber. The exterior of inner section 68 is provided with radially extending fins 70 contoured to abut the interior surface of an outer section 72 to form a double insulative wall of the steeping chamber.

As shown in FIGS. 2A and 5B, a stepped groove 74 in a posterior segment of the outer section 72 of the steeping chamber is provided to engage a flange 73 of a steeping chamber support arm 76 which is vertically hinge-mounted by insertion of hinge pins 75 and 77 in respective hinge pin seats 175 and 177. The steeping chamber 30 supported by arm 76 can thus be swung about hinge pins 75 and 77 out of alignment with the water reservoir inlet and heated water distributor structure 26 to allow access to the interior of the steeping chamber, to insert or remove brewing material such as tea, and to allow the steeping chamber to be disengaged from support arm 76. The support arm 76 is removable from the device by vertical displacement of upper and lower hinge pins 75 and 77 to disengage upper hinge pin 75 from hinge pin seat 175 and lower hinge pin 77 from lower hinge pin seat 177.

Figure 9:
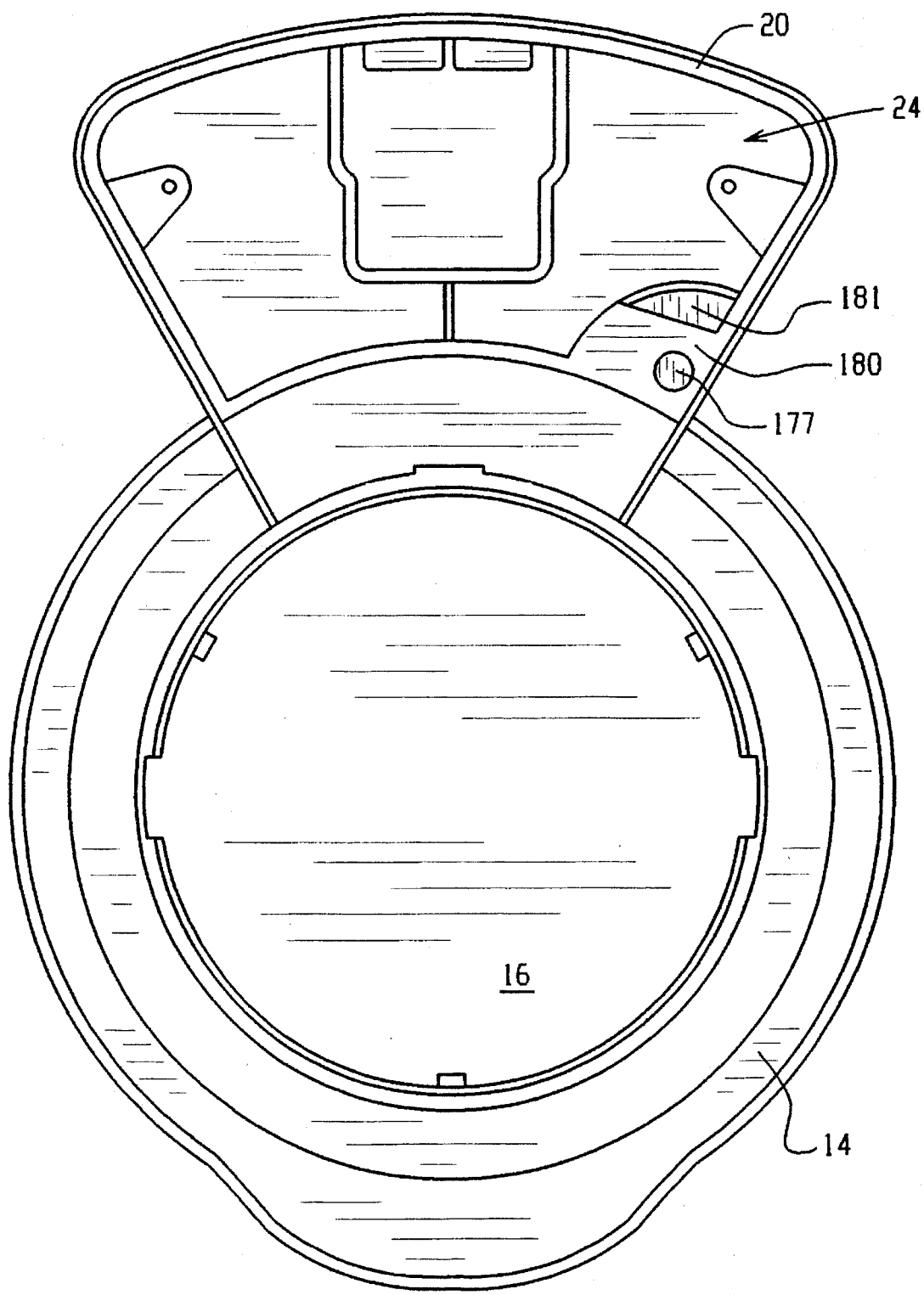
FIG. 9 is a top view of the rearward and forward section of the automatic tea brewing device of the present invention.
Figure 10A:
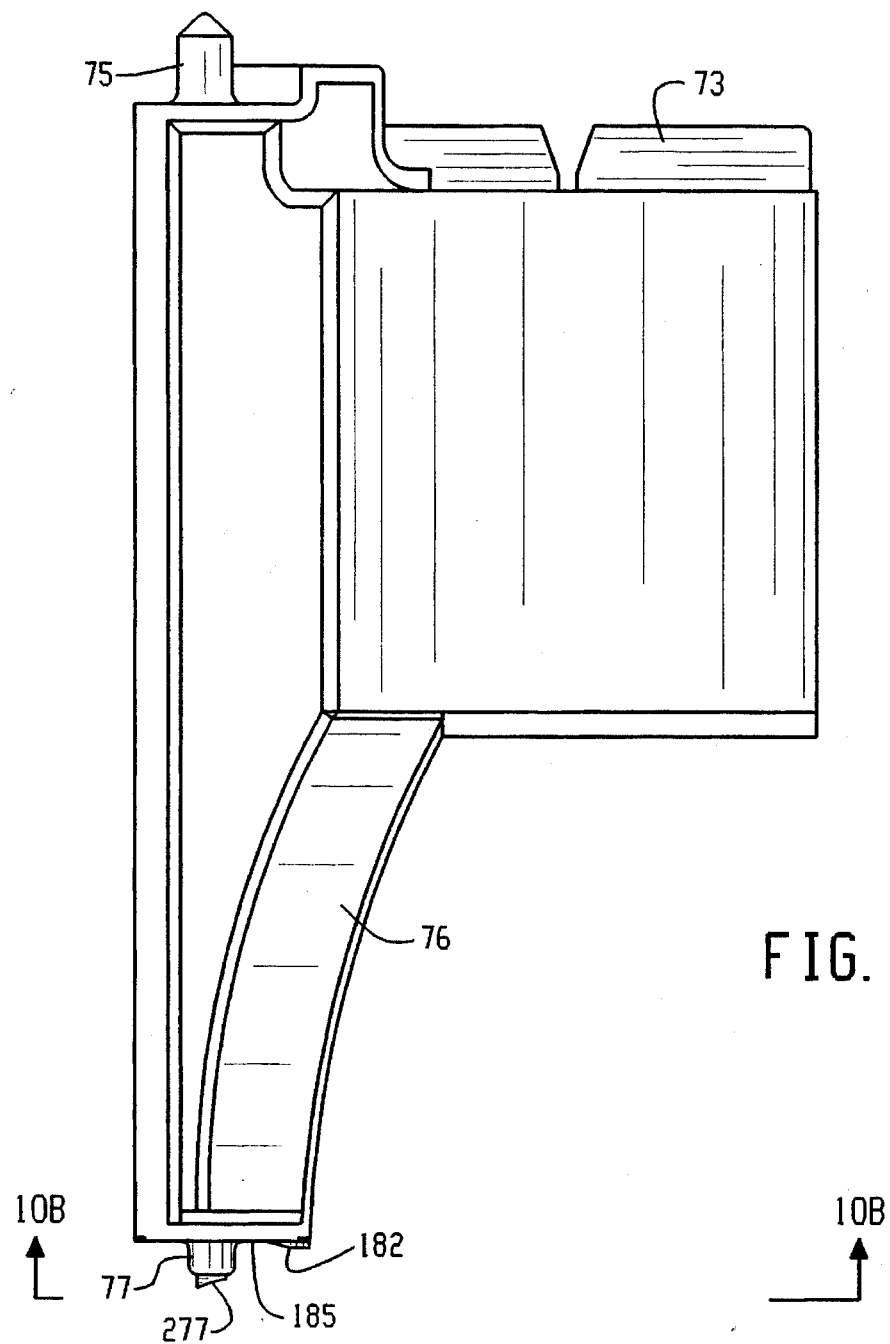
FIG. 10A is a side elevation of the steeping chamber support arm of the automatic tea brewing device of the present invention.
Figure 10B:
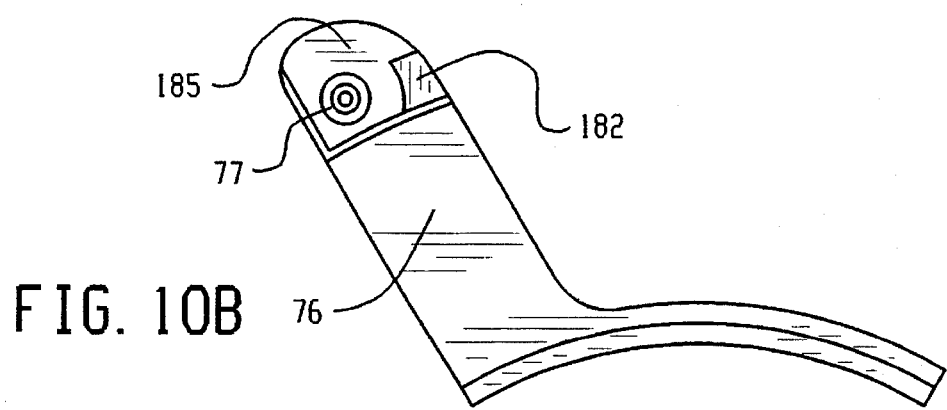
FIG. 10B is an end view taken in the direction of the arrows 10B–10B in FIG. 10A.

The surface 180 in which hinge pin seat 177 is formed is shown from the top in FIG. 9 which is a top view of rearward section 20 and forward section 14 including warming platform 16. A cam 181 is formed to rise from surface 180 to gradually vertically lift support arm 76 as it is swung into a closed position (underneath the heated water distributor structure 26) flush against the forward wall of reservoir 24. As shown in FIGS. 10A and 10B, a corresponding cam 182 may be formed to rise from surface 185 of support arm 76, about hinge pin 77, also to gradually vertically lift support arm 76, in cooperation with cam 181, as it is swing into the closed position. Cams 181 and 182 serve to increase the accuracy of alignment of the steeping chamber in a closed position under the heated water distributor structure 26. The close tolerance fit of the top edge of the steeping chamber with the bottom edge of the heated water distributor structure (as shown in FIG. 2A) reduces the amount of brewing steam lost through the open top of the chamber. As further shown in FIG. 10A, in lieu of cam 181, a cam 277 may be formed on the end of hinge pin 77 similarly to lift the support arm by rotation against a corresponding cam 273 formed in hinge pin seat 177.

Figure 11:
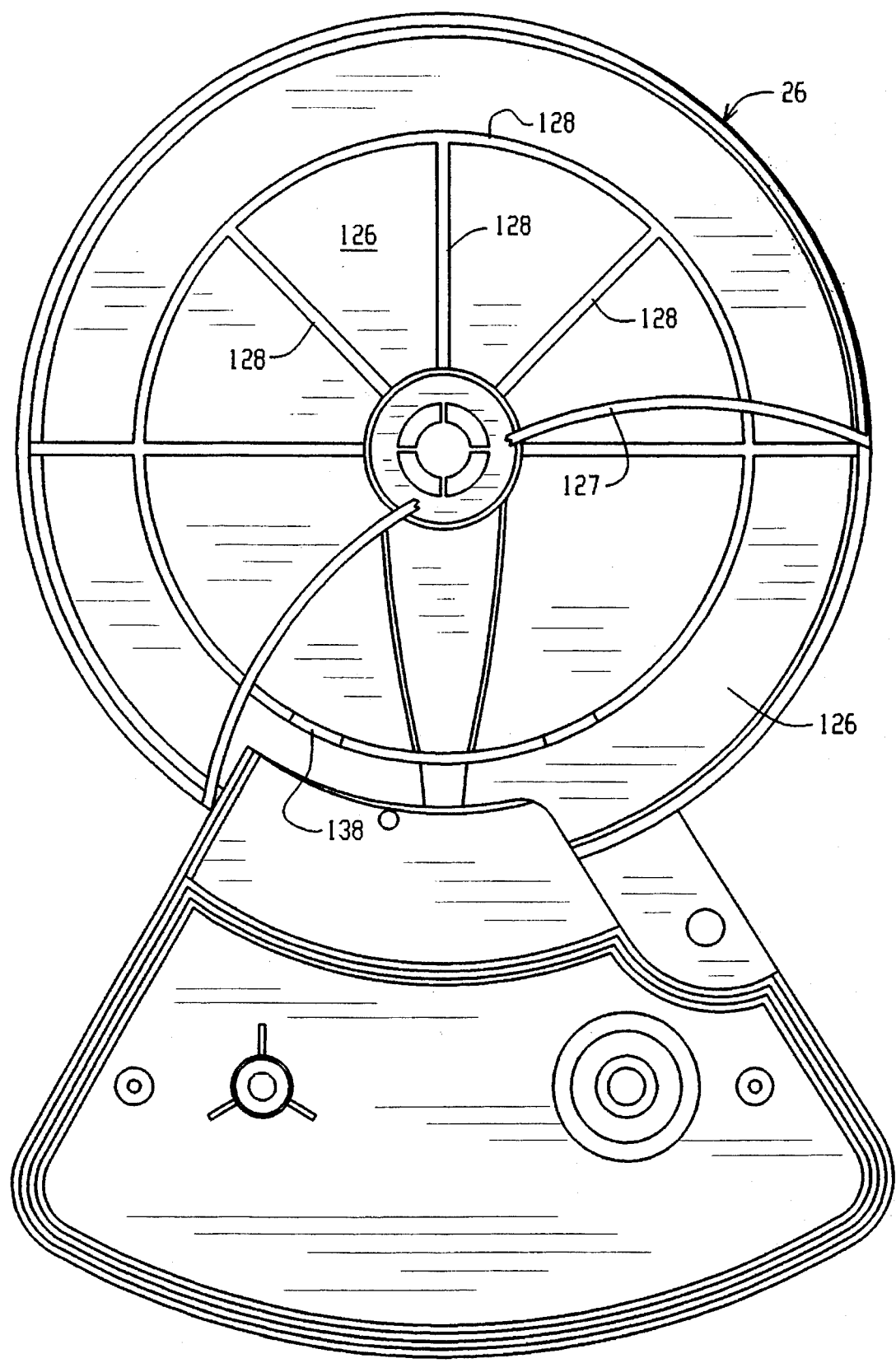
FIG. 11 is a view of underside of the combined water inlet and heated water distributor structure and water reservoir of the automatic tea brewing device of the present invention.

As the steeping chamber 30 is thus swung in and out of alignment with the water reservoir inlet/heated water distributor structure 26, a leading top edge 35 of steeping chamber 30 contacts an underside surface area 126 of structure 26 (shown in FIG. 11) which includes a plurality of structural ribs 128 and further includes an arcuate ramped bearing surface 127 slightly raised from surface 126 and ribs 128 to provide a bearing surface for the leading top edge 35 of brew basket 30 to glide into alignment underneath structure 26. As shown in FIG. 5B, leading edge 35 of steeping chamber 30 may be chamfered to further reduce resistance of contact of the steeping chamber with bearing surface 127 of structure 26. A latch point 138 protrudes from surface 126 to engage a locking tab 139 which protrudes from a top surface of the steeping chamber 30 as shown in phantom in FIG. 5A to secure the brew basket in the closed position.

Figure 6A:
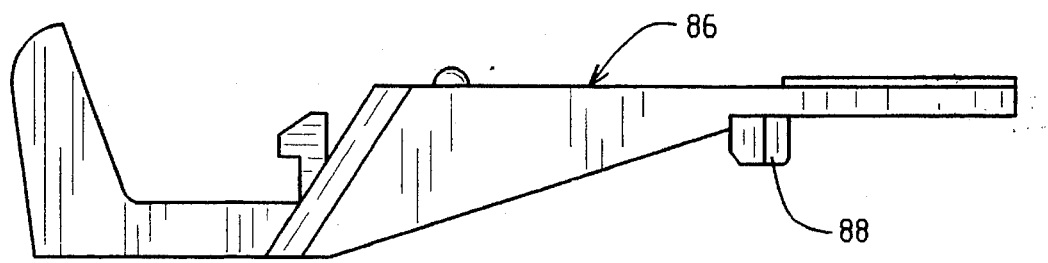
FIGS. 6A–6C are side, top and end views, respectively, of the control arm of the flow control valve of the automatic tea brewing device of the present invention.
Figure 6B:
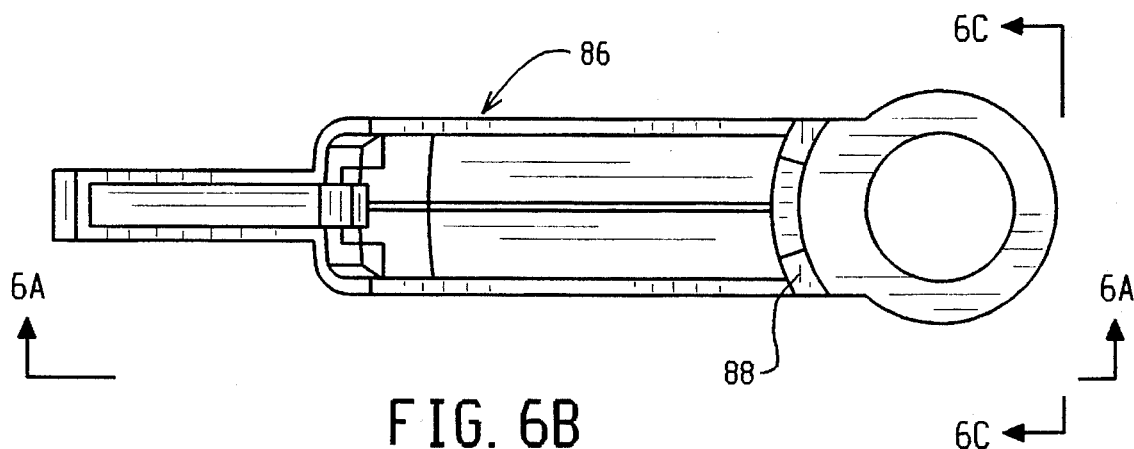
Figure 6C:
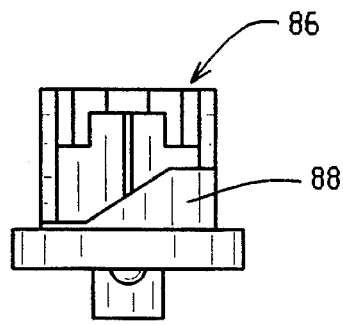
Figure 7C:
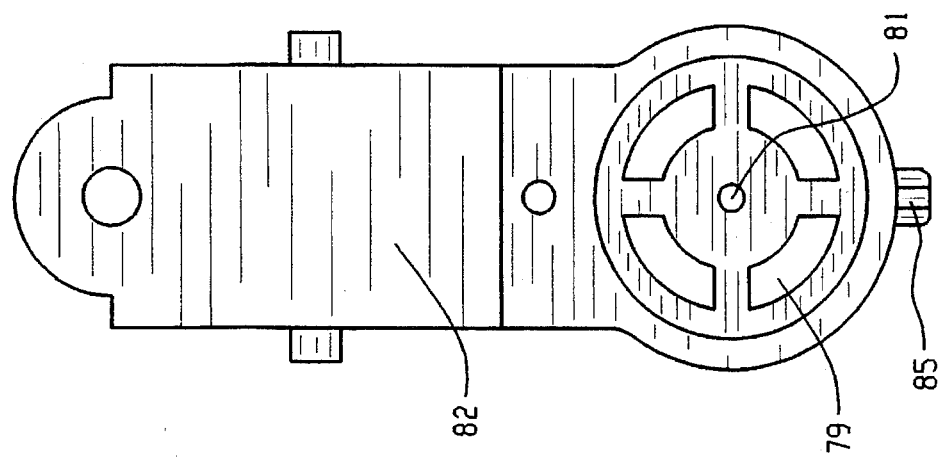
FIGS. 7A–7C are top, side and bottom views, respectively, of the valve plunger arm of the valve assembly of the present invention.
Figure 7A:
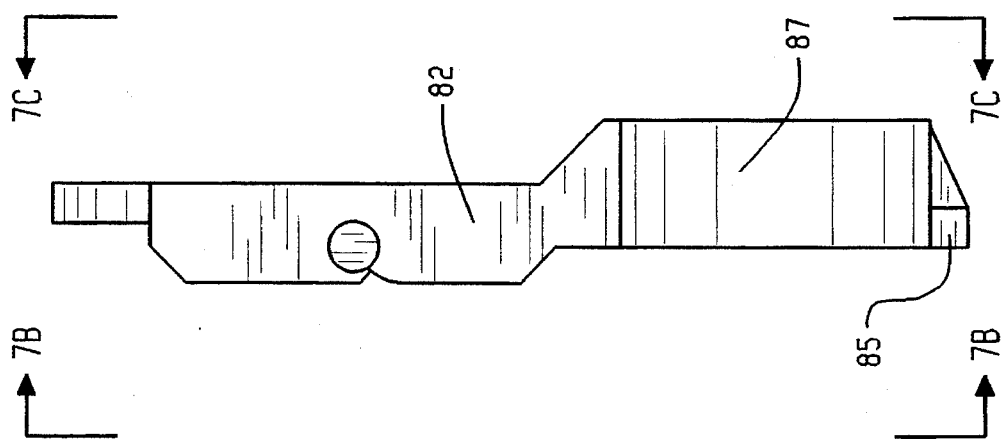
Figure 7B:
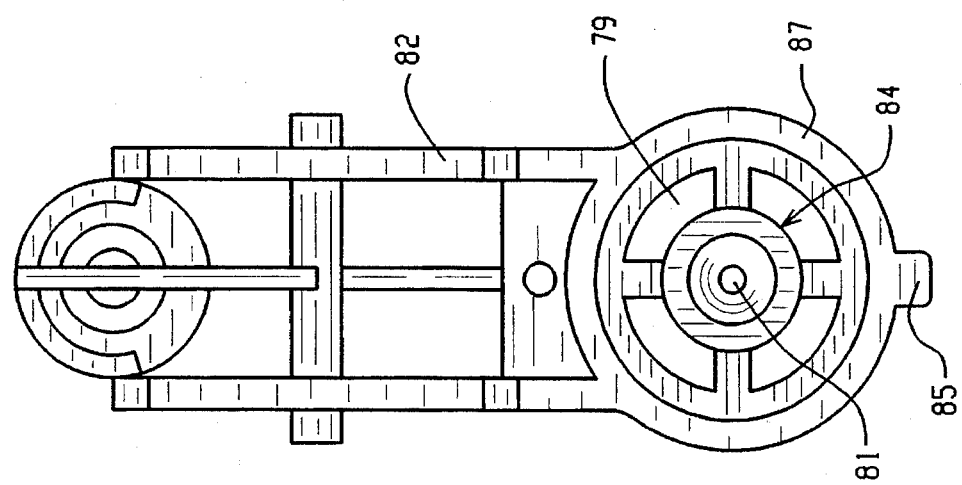

The rate of flow of heated water through the steeping chamber 30 is regulated by a novel flow control valve pivotally secured to the bottom of the inner section 68. The flow control valve, indicated generally at 80 in FIG. 2A, includes a valve arm 82 which supports a frusto-conical valve plunger 84 positioned and biased by a spring 83 for partial adjustable insertion into the brewed tea exit port 57 which has a complementary frusto-conical shape. A toggle control arm 86, pivotally secured about the neck of exit port 57 includes a vertical displacement cam or ramp 88 (shown in isolated detail in FIGS. 6A–6C) in contact with a distal tab 85 of valve arm 82, whereby radial adjustment of toggle control arm 86 changes the relative position of distal tab 85 of valve arm 82 upon displacement of ramp 88 to thereby adjust the relative position of valve plunger 84 within exit port 57 and the consequent flow rate of liquid therethrough. A finger tab 89 on the forward distal end of toggle control arm 86 allows the valve to be easily adjusted from the front of the steeping chamber. A small through-hole 81 (e.g., 0.080" diameter) is provided in valve plunger 84 to define a minimum flow rate and elevation of the steeping head in the steeping chamber. As shown in isolated detail in FIGS. 7A–7C, the valve arm 82 further includes a cylindrical wall 87 which surrounds valve plunger 84 and drain holes 79 disposed radially about plunger 84. Wall 87 has a height dimension substantially equal to a height dimension of plunger 84. As shown in FIG. 2A, the top of wall 87 is positioned slightly higher than the lowermost point of exit port 57 to contain all liquid which drains through port 57 for flow rate controlled passage through the valve.

To prepare hot brewed tea in accordance with the apparatus and method of the invention, the water reservoir is filled with an appropriate amount of water, for example, the maximum capacity which is approximately equal to the maximum capacity of tea pot 32. A brewing material such as tea is placed in the steeping chamber in an open position swung out from under the combined water inlet and heated water distributor structure. The steeping chamber is then swung and locked into the closed position under the combined water inlet and heated water distributor structure. Heating and warming element 38 is energized by operation of switch 40 to begin thermal dynamic pumping of water from the water reservoir to the heated water distributor structure, into the steeping chamber, and through the steeping chamber valve into the tea pot. Upon completion of the steeping operation, the tea is ready to be served directly from the tea pot and/or kept warm in the tea pot upon the warming platform.

Although the invention has been described with respect to certain preferred and alternate embodiments, modifications and variations which may occur to those of skill in the art are equivalent to and within the scope of the invention as defined by the accompanying claims.

What is claimed is:

1. A device for brewing hot tea comprising:
   a water reservoir,
   a combined water reservoir inlet and heated water distributor structure connected to and extending from of the water reservoir,
   a steeping chamber supported by a swing arm hinge mounted to the water reservoir and positionable under the combined water inlet and heated water distributor structure, and
   a base for a brewed tea receptacle, the base positioned forward of the water reservoir and under a brewed tea exit port in the steeping chamber.

2. The device of the claim 1 further comprising a heating element connected to a fluid passageway connected to the water reservoir for receiving and heating water from the water reservoir and pumping the water into the combined water filling and distributor structure.

3. The device of claim 1 wherein the steeping chamber is comprised of an inner section and an outer section, and a flow control valve in a bottom opening of the steeping chamber for releasing brewed tea into a receptacle positioned on the base, a control arm of the flow control valve being attached to the inner section of the steeping chamber, and a valve arm attached to a valve plunger pivotably attached to a bottom side of the inner section of the steeping chamber.

4. The device of claim 3 wherein the flow control valve comprises corresponding conical surfaces.

5. The device of claim 4 wherein a separation distance of the mating conical surfaces of the valve is adjustable by pivotal motion of a valve control arm.

6. The device of claim 5 wherein the valve control arm is pivotally secured about the neck of the exit port of the steeping chamber.

7. The device of claim 5 wherein the valve control arm further comprises a vertical displacement ramp in contact with a distal tab of the valve arm which supports the valve plunger.

8. The device of claim 4 wherein the flow control valve further comprises a valve plunger having a conical surface and a through-hole.

9. The device of claim 8 wherein the flow control valve further comprises a pivotable valve arm which supports the valve plunger, drain holes in the valve arm about the valve plunger, and a wall which surrounds the valve plunger.

10. The device of claim 9 wherein the valve arm is connected to a spring which biases the valve plunger in the exit port of the steeping chamber.

11. The device of claim 1 further comprising a brewed tea receptacle comprised of a generally bulbous body, a top opening, a curvilinear handle integrally attached to and extending from the body, a spout extending from the body at a point generally opposite the handle, the spout having an opening separate from the top opening, and a generally flat bottom.

12. The device of claim 11 further comprising a cover for the top opening of the brewed tea receptacle, the cover dimensioned to alternatively cover an opening in the water reservoir inlet.

13. The device of claim 1 wherein the water reservoir inlet further comprises an opening, the opening comprising a generally circular aperture, a dome positioned in a central area of the aperture, and a plurality of fins extending radially from the dome to peripheral edges of the aperture.

14. The device of claim 1 wherein the swing arm further comprises hinge pins adapted for insertion in hinge pin seats.

15. The device of claim 14 further comprising at least one cam surface at the interface of the swing arm hinge pins and hinge pin seats operative to alter an elevation of the swing arm and steeping chamber relative to the device as the swing arm and steeping chamber are swung into alignment with the water reservoir inlet and heated water distributor structure.

16. The device of claim 1 wherein an underside surface of the combined water reservoir inlet and heated water distributor structure further comprises a ramp and bearing surface which extends from the underside surface for contact with a leading edge of the steeping chamber.

17. The device of claim 1 in combination with a brewed tea receptacle having a generally bulbous body, a handle, and a spout which extends from the bulbous body and has an opening separate from an opening to the bulbous body.

18. An apparatus for brewing, warming and serving hot tea comprising:
   a water reservoir;
   a combined water reservoir inlet and heated water distributor structure attached to the water reservoir, the structure including a water inlet hole and a heated water distributor hole,
   a base for receiving a brewed tea receptacle, the base attached to the water reservoir and positioned under the combined water reservoir inlet and heated water distributor structure, the base having a substantially flat surface,
   a heating element in the base in thermal contact with a unidirectional fluid passageway from the water reservoir to the heated water distributor structure,
   a steeping chamber removably supported by a hinge mounted support arm attached to the water reservoir and positionable underneath the combined water inlet and heated water distributor structure, and
   a brewed tea receptacle having a body with a top opening, a handle, and a spout having an opening separate from the top opening of the body.

19. The apparatus of claim 18 wherein the brewed tea receptacle further comprises a substantially flat bottom which rests flush against the flat surface of the base.

20. The apparatus of claim 18 wherein the hinge mounted support arm further comprises a cam operative to vertically lift the support arm as it is swung into alignment with the combined water reservoir inlet and heated water distributor structure.

21. The apparatus of claim 18 further comprising a latch point on an underside of the combined water inlet and heated water distributor structure, the latch point engageable with a locking tab on the steeping chamber.

22. The apparatus of claim 18 further comprising an arcuate bearing surface on an underside of the combined water inlet and heated water distributor structure.

23. The apparatus of claim 18 wherein the water inlet hole is positioned over the heated water distributor hole.

24. An automatic tea brewing device comprising:
 a water reservoir,
 a combined water inlet and heated water distributor structure extending from the water reservoir,
 a steeping chamber supported by a hinge mounted support arm and positionable under the combined water inlet and heated water distributor structure,
 a base for receiving a tea pot under the steeping chamber,
 and a tea pot for receiving brewed tea from the steeping chamber, the tea pot having a main body with a top opening, a handle attached to the main body, and a spout extending from the main body and having a spout opening separate from the top opening.

25. An apparatus for brewing hot tea, comprising:
 a base having a forward section with a tea pot warming platform and a rearward section which supports a water reservoir,
 a combined water inlet and heated water distributor structure which extends from the water reservoir and over the tea pot warming platform,
 a steeping chamber supported by a hinge mounted support arm and positionable underneath a heated water distributor hole in the combined water inlet and heated water distributor structure,
 a heating element in the base in contact with a conduit extending from the water reservoir to the heated water distributor hole, and
 a tea pot having a flat bottom which sits flush upon the tea pot warming platform.

26. An automatic tea steeping device for automatically steeping and dispensing tea directly into a tea pot, the device comprising:
 a water reservoir for holding water for steeping tea,
 a water reservoir inlet located adjacent the water reservoir,
 a heated water distributor hole located under the water reservoir inlet,
 a heating element in contact with a water conduit connecting the water reservoir to the heated water distributor hole,
 a steeping chamber supported under the heated water distributor hole, the steeping chamber having a flow control valve for controlling the rate of flow of liquid through the steeping chamber, and
 a base for supporting a tea pot at a position underneath the steeping chamber.

27. A tea brewing device comprising a tea pot base, a water reservoir, a steeping chamber for receiving tea and heated water from the water reservoir, a heating element for heating and transferring water from the water reservoir to the steeping chamber, an adjustable flow control valve on the bottom of the steeping chamber for controlling a rate of flow of water through the steeping chamber, and a tea pot dimensioned to fit upon the tea pot base and underneath the steeping chamber.

28. The tea brewing device of claim 27 wherein the flow control valve comprises mating frusto-conical surfaces.

29. The tea brewing device of claim 27 wherein the steeping chamber comprises an inner Section and an outer section and the adjustable flow control valve is attached to the inner section.

30. The tea brewing device of claim 27 wherein the tea pot comprises a flat bottom which rests flush upon the tea pot platform.

* * * * *